United States Patent
Wierenga (10) Patent No.: US 10,816,938 B2
(45) Date of Patent: *Oct. 27, 2020

(54) WATCH STAND

(71) Applicant: Griffin Technology, LLC, Irvine, CA (US)

(72) Inventor: Aaron Wierenga, Nashville, TN (US)

(73) Assignee: GRIFFIN TECHNOLOGY, LLC, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/002,753

(22) Filed: Jun. 7, 2018

(65) Prior Publication Data

US 2018/0284699 A1  Oct. 4, 2018

Related U.S. Application Data

(63) Continuation of application No. 15/331,107, filed on Oct. 21, 2016, now Pat. No. 9,996,055.

(60) Provisional application No. 62/244,907, filed on Oct. 22, 2015.

(51) Int. Cl.
| | |
|---|---|
| *G04G 19/00* | (2006.01) |
| *F16M 11/22* | (2006.01) |
| *H02J 7/02* | (2016.01) |
| *F16M 13/00* | (2006.01) |

(52) U.S. Cl.
CPC ............ *G04G 19/00* (2013.01); *F16M 11/22* (2013.01); *F16M 13/00* (2013.01); *H02J 7/025* (2013.01); *F16M 2200/08* (2013.01)

(58) Field of Classification Search
CPC ........ G04G 19/00; F16M 13/00; F16M 11/22; H02J 7/025

USPC .......................................................... 320/108
See application file for complete search history.

(56) References Cited

U.S. PATENT DOCUMENTS

| | | | | |
|---|---|---|---|---|
| 4,873,677 A * | 10/1989 | Sakamoto | ............... | H02J 50/10 368/204 |
| 5,752,600 A * | 5/1998 | Kurashina | .............. | B65D 85/40 206/301 |
| 7,919,948 B2 * | 4/2011 | Kikuchi | ................ | G06F 1/1632 320/115 |
| 8,714,813 B2 * | 5/2014 | Liao | ........................ | G04D 7/009 368/206 |
| 9,577,467 B1 * | 2/2017 | Karanikos | ............... | H02J 7/025 |
| 9,831,713 B2 * | 11/2017 | Kato | ...................... | H02J 7/0042 |
| 2013/0336709 A1 * | 12/2013 | Kreller | ...................... | E04G 7/20 403/246 |
| 2016/0012968 A1 * | 1/2016 | Chiu | ....................... | H01F 38/14 320/108 |

(Continued)

*Primary Examiner* — M Baye Diao (57) ABSTRACT

A configurable watch stand capable of supporting and charging a smart watch, such as an Apple Watch is disclosed. The watch stand includes a base support, a multisided open-ended sleeve extending from the base support, and a post configured to be removably inserted into an opening of the sleeve and fixedly positioned thereon. The post includes an angled support surface that is configured to retain a watch charger and a helical groove that encircles the exterior of the post that is configured to receive and manage a cable wrapped thereabout. The base support may be sloped and may include a lip structure on one side, a cable management system on the underside, and a wireless charging surface on the top side. The height and/or orientation of the angled support surface relative to the base may be configurable or adjustable.

20 Claims, 8 Drawing Sheets

(56) References Cited

U.S. PATENT DOCUMENTS

2016/0261139 A1* 9/2016 Kidakarn ............... H02J 7/025
2017/0133874 A1* 5/2017 Loewen ............... H02J 7/0044

* cited by examiner

WATCH STAND

INCORPORATION BY REFERENCE TO RELATED APPLICATIONS

This application is a continuation of U.S. patent application Ser. No. 15/331,107, filed Oct. 21, 2016, which claims benefit under 35 U.S.C. § 119(e) from U.S. Provisional Application No. 62/244,907, filed on Oct. 22, 2015. The above applications are hereby incorporated by reference in their entirety and are to be considered a part of this specification.

BACKGROUND

Field of the Invention

This patent document relates to watch stands capable of supporting and charging a smart watch.

Description of the Related Art

Mobile electronic devices with interactive touch screen interfaces are becoming more and more prevalent with many consumers regularly relying on multiple devices like smart phones, tablets, and more recently smart watches, such as those developed by Apple Inc. and marketed under the Apple Watch. (Apple and Apple Watch are registered trademarks of Apple Inc.) One source of ongoing consumer frustration, however, has been managing the storage and charging of such devices and their respective charging cables. It is here recognized that a need therefore continues to exist for user friendly watch stand solutions that are capable of conveniently supporting and charging a smart watch as well as other mobile electronic devices.

SUMMARY

User friendly watch stands capable of charging and storing a smart watch are disclosed. The watch stands include a base support, a sleeve extending from the base support, and a post configured to be removably inserted into the sleeve and fixedly positioned therein. In one aspect, the post includes an angled watch support surface configured to charge and support a smart watch in either portrait or landscape orientations. The watch support surface includes a cavity to receive a watch charger.

In another aspect, the post includes a helical track or groove in the exterior surface of the post. The helical track is configured to receive and manage a charging cable. When the post is inserted into the sleeve, the sleeve protects, encloses and conceals the cable on the helical track.

In another aspect, the top surface of the base is sloped downward as it extends from a first side to a second side. A lip structure may also be included at the down-slope side to keep the mobile electronic device from falling off the stand.

In another aspect, the post may have a hollow core to provide for additional storage capacity, such as a charging battery.

In another aspect, the post height relative to the sleeve may be adjustable.

In another aspect, the watch support surface may be configurable to provide different orientations relative to the base support.

In another aspect, the base support includes a cable management system on its bottom side. The cable management system may be concealed from view when the base support is placed on the support surface such as a table or desk.

In yet another aspect, the base support system may include a wireless charging surface. The wireless charging surface may be elevated relative to adjacent regions of the top surface of the base.

Yet other aspects relate to the manufacture, construction, and configuration of the constituent components of the watch stand embodiments disclosed herein.

It should be understood that each of the foregoing and various aspects, together with those set forth in the claims and summarized above or otherwise disclosed herein, including the drawings, may be combined to form claims for a device, apparatus, system, method of manufacture, and/or use.

BRIEF DESCRIPTION OF THE DRAWINGS

These and other features, aspects and advantages are described below with reference to the drawings, which are intended to illustrate but not to limit the invention. In the drawings, like reference characters or numerals denote corresponding features consistently throughout disclosed embodiments.

FIGS. 4A-4B are perspective views of the watch stand illustrated in FIG. 1 illustrating how a smart watch and smart phone may be positioned on the watch stand for storage and charging. The smartphone is sitting on edge propped-up by a lip structure extending on one side of the watch stand and leaning on the sleeve of the watch stand. In FIG. 4A, the smart watch is positioned in a landscape orientation on an angled support surface of the watch stand with the watch strap wrapped around the opposing side of the sleeve/post and the angled support surface configured to be generally facing toward the lip structure. In FIG. 4B, the smart watch is positioned in portrait orientation on the angled support surface with the watch strap hanging open with the angled support surface rotated 90 degrees from its orientation illustrated in FIG. 4A.

FIGS. 5A-5B are perspective views of another implementation of the watch stand illustrated in FIG. 1 that includes an extended base with an elevated wireless charging surface and showing how a smart watch and smart phone may be positioned on the watch stand for storage and charging. FIG. 5A illustrates the smart phone laying on its backside on top of the wireless charging surface, while FIG. 5B illustrates the smart phone laying on edge propped-up by the sidewall of the wireless charging surface and leaning on the sleeve of the watch stand.

DETAILED DESCRIPTION OF THE PREFERRED EMBODIMENT

As summarized above and illustrated in the drawings, disclosed herein are various aspects of a watch stand implementations capable of providing convenient and user friendly storage and charging of smart watches and other electronic devices such as smart phones. Aspects of which are summarized above and illustrated in the drawings.

As set forth above, FIGS. 1-6 illustrate various views and constituent components of a convenient and user friendly watch stand implementations. FIGS. 1-4B illustrate a first embodiment of a watch stand 10 having a base support 11 including a top surface and an opposing bottom surface configured to stand on a support surface such as a desk or table, a sleeve 12 extending from the top surface of the base support 11 at a first end section to an open ended second end section, and a post 13 extending from a first end region to a second end region and being configured to slide into the sleeve 12 at its first end region via the opening at the second end section of the sleeve 12.

The top surface of the base support 11 is inclined or slopped as it extends from a first side toward an opposing second side. A lip structure 18 extends upward from the opposing second side to retain and provide support to a mobile device, such as a smart phone positioned on the base, as best illustrated in FIGS. 4A and 4B.

Figure 1:
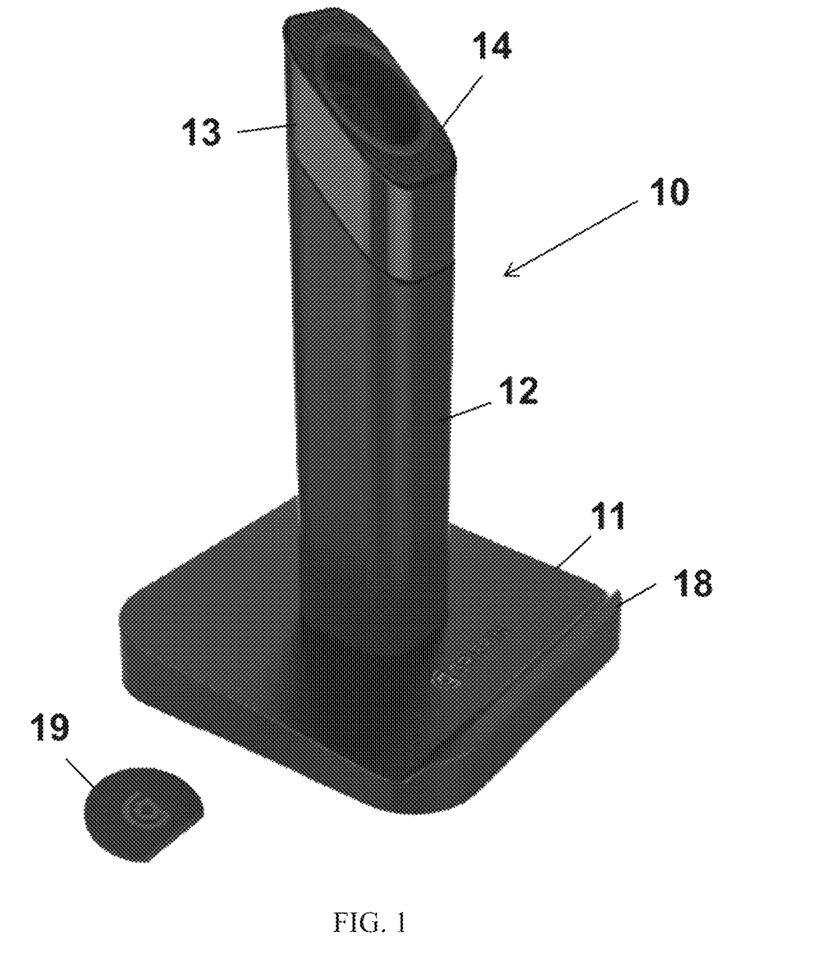
FIG. 1 is a perspective view of a first embodiment of a watch stand with the insert for the watch charger removed from the watch support surface and the post fully inserted and in the sleeve.
Figure 2:
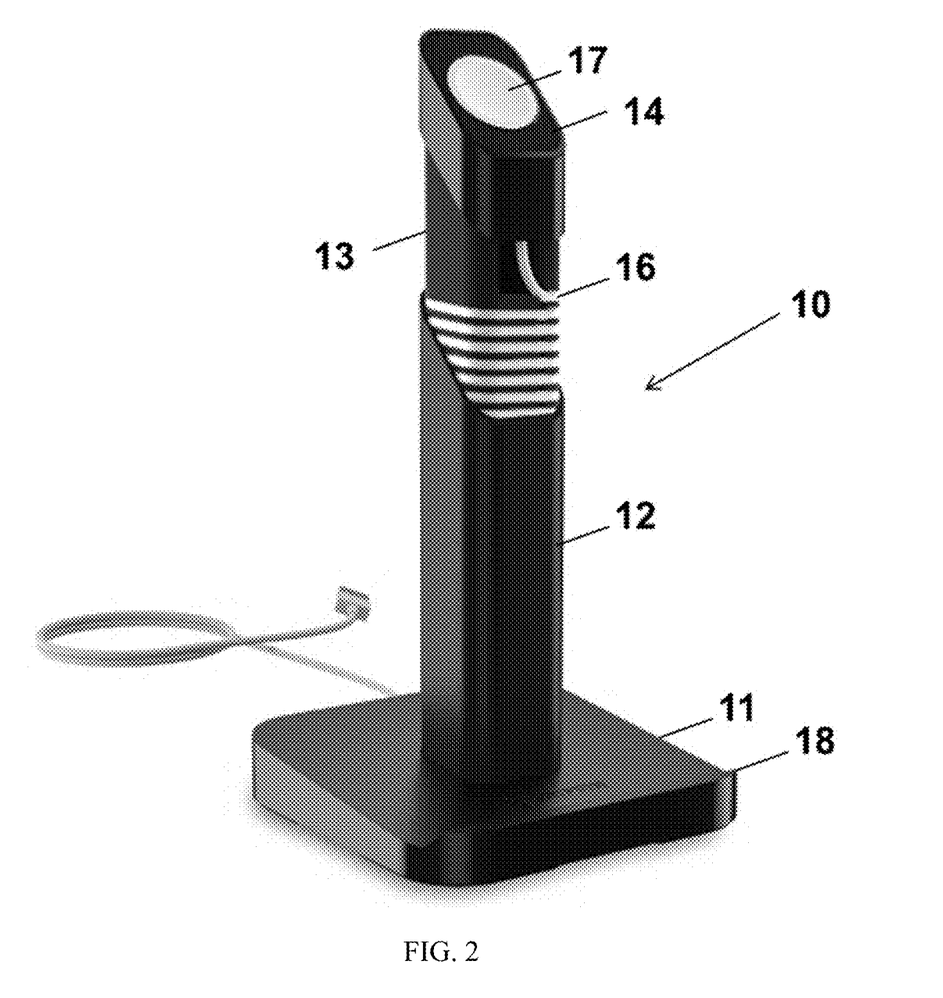
FIG. 2 is another perspective view of the watch stand depicted in FIG. 1 with the post height adjusted upward to reveal the charging cable extending from the watch charger and a helical cable management track that is incorporated into the exterior surface of the post.

The sleeve 12 is formed of a multi-sided structure that defines a passageway for insertion of the post 13. As best illustrated in FIGS. 1 and 2, the terminations of the wall structures that form the sides at the second end section provide an angled edge surface that serves to support a corresponding mating edge surface of the post 13 when the post 13 is fully inserted into the sleeve 12.

Figure 3:
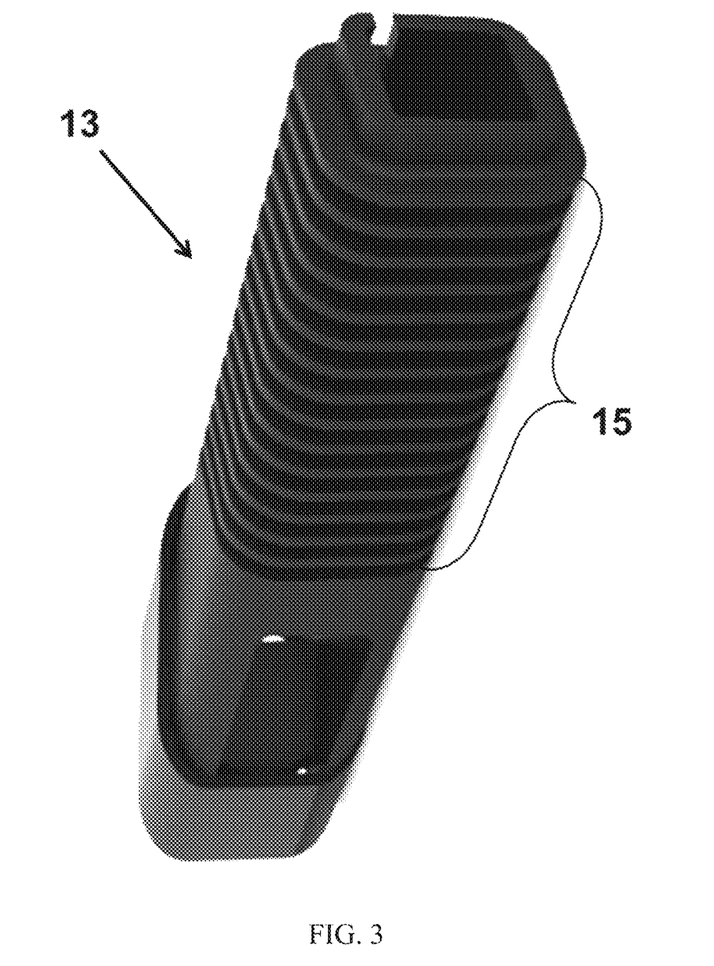
FIG. 3 is a perspective view of the post component of the watch stand depicted in FIG. 1 and illustrating a hollow core and further illustrated the helical cable management track.

The post 13 includes an angled watch support surface 14 at the second end region, which includes a cavity to house a watch charger 17. An insert or lifter 19 may be provided to fit into the cavity to facilitate positioning of the charger in the cavity. The post 13 further includes a helical groove or track 15 that encircles its exterior surface from below the angled support surface 14 to the first end region. As best illustrated in FIG. 2, the helical track 15 is dimensioned to receive and manage a power cable 16 that extends from the watch charger 17 that is housed within the cavity opening on the angled support surface 14. Also as best illustrated in FIG. 2, the height of the post 13 above the base 11 may be adjusted upward from a fully inserted position (illustrated for example in FIG. 1) where the upper edge surfaces of the sleeve 12 are mated to the corresponding mating edge surface of the post 13 located at the second end region underneath the angled watch support surface. As best illustrated in FIG. 3 the post 13 may be hollow to allow for additional storage for example for a battery.

Figure 4A:
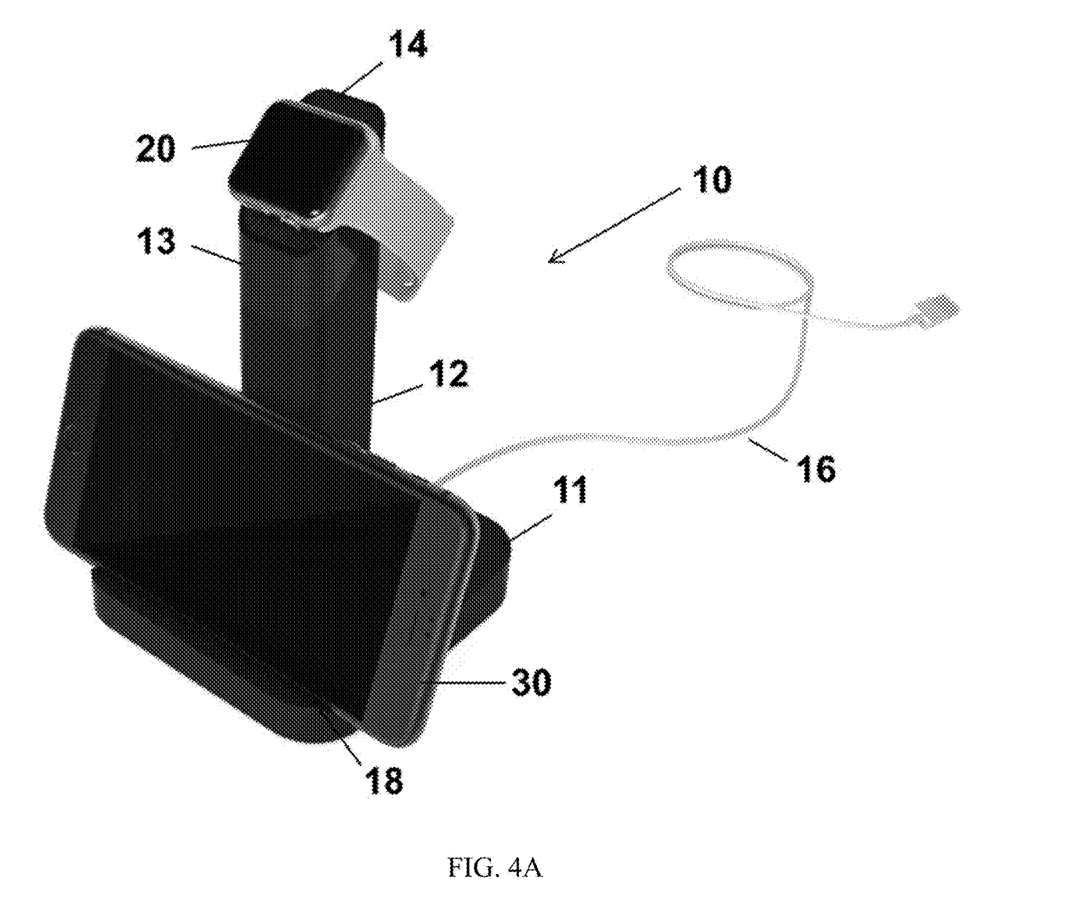
Figure 4B:
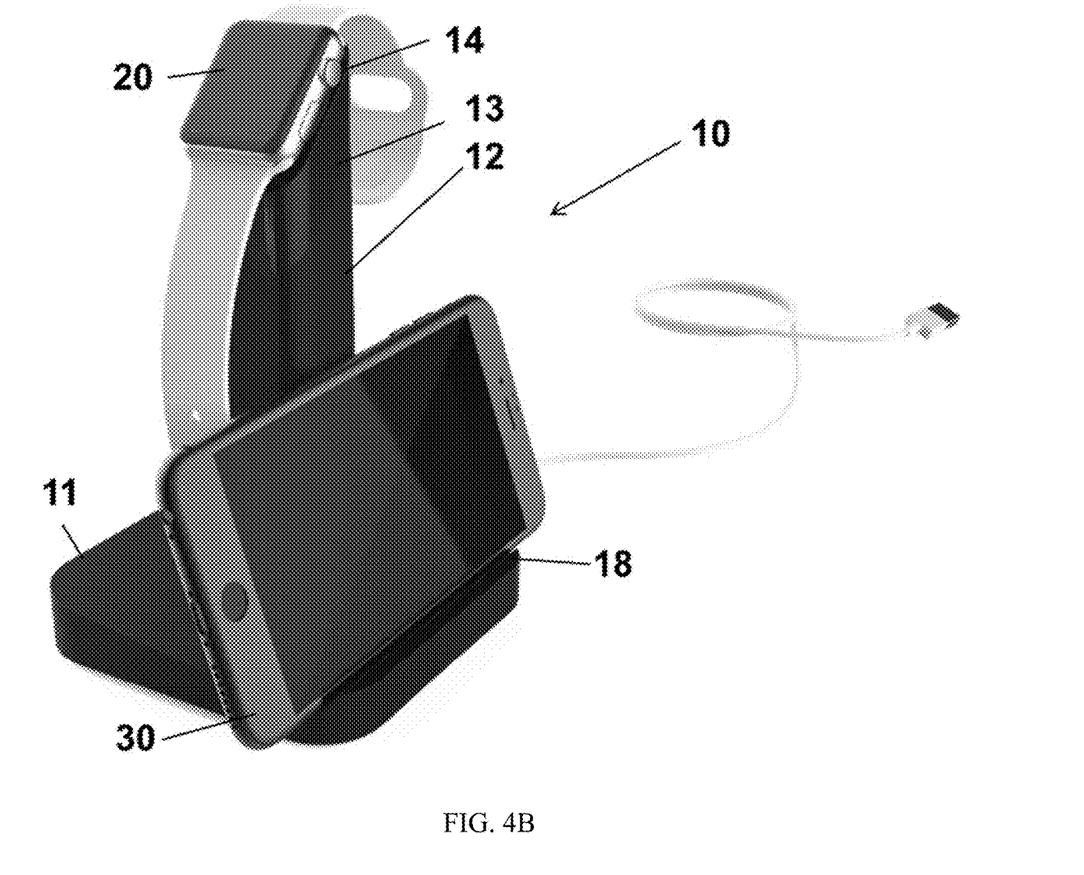

FIGS. 4A and 4B depict how a smart watch 20 and smart phone 30 may be positioned on the watch stand 10 for storage and charging. As depicted, the smartphone 30 is sitting on edge supported or propped-up by a lip structure 18 extending on one side of the watch stand and leaning on the sleeve 12 of the watch stand 10. In FIG. 4A, the smart watch 20 is positioned in a landscape orientation on the angled support surface 14 of the watch stand 10 with the watch strap wrapped around the opposing side of the sleeve/post and the angled support surface 14 oriented so that it is generally facing toward the lip structure 18. In FIG. 4B, the smart watch 20 is positioned in portrait orientation on the angled support surface 14 with the watch strap hanging open and the angled support surface 14 being rotated 90 degrees from its orientation illustrated in FIG. 4A.

Figure 5A:
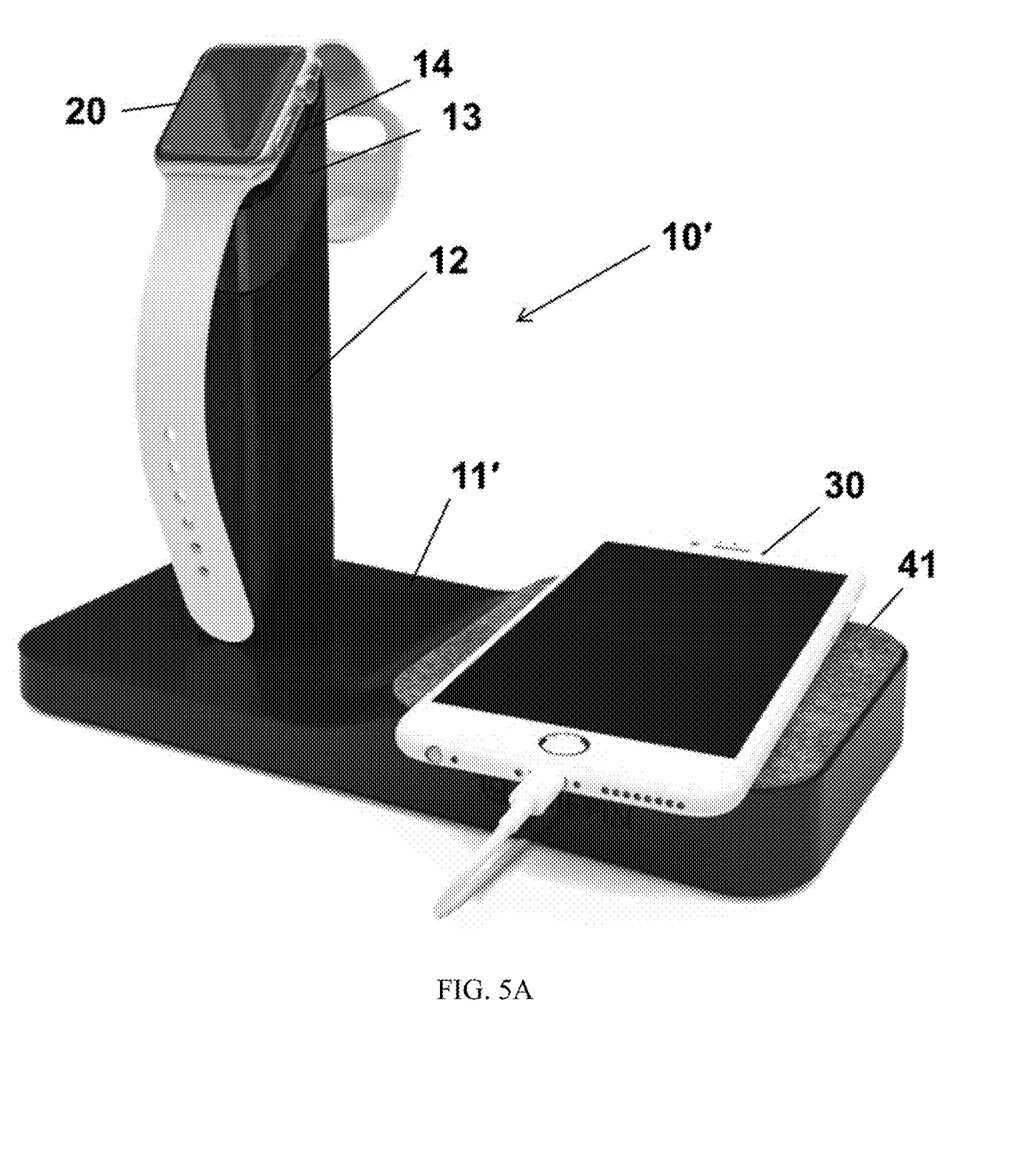
Figure 5B:
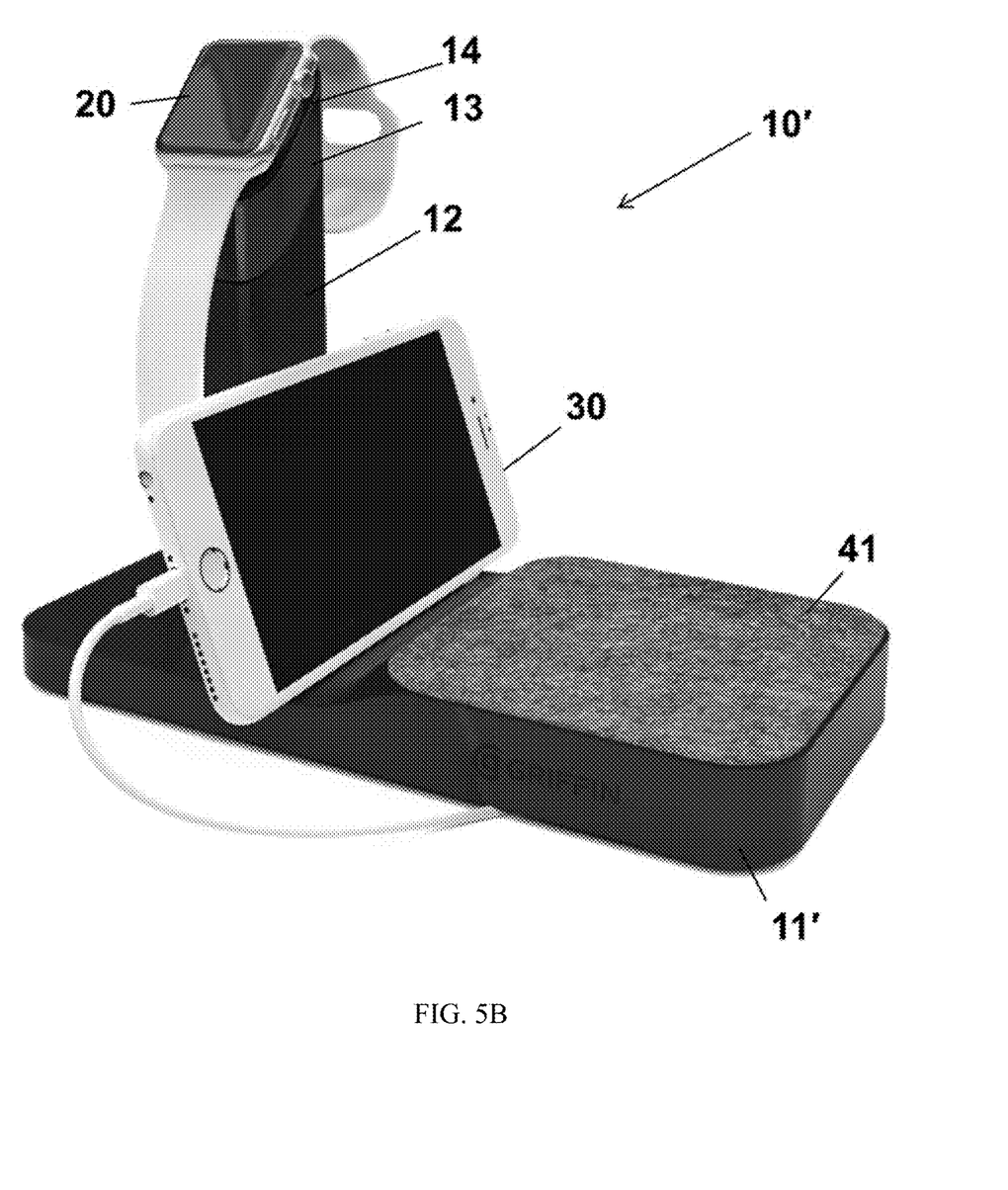
Figure 6:
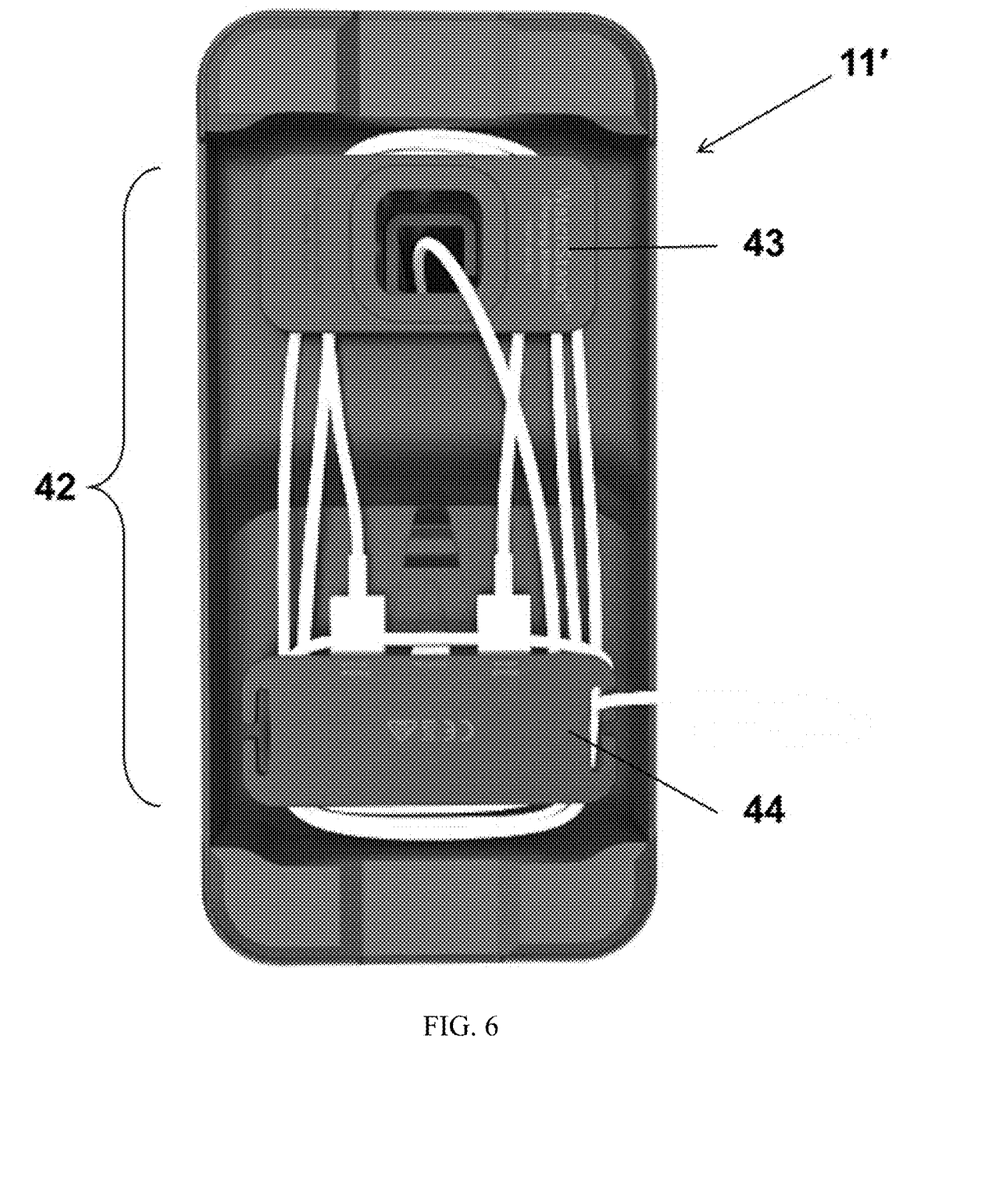
FIG. 6. is a bottom view of the watch stand depicted in FIGS. 5A-5B illustrating how the cable extends through the post and sleeve of the watch stand and is wrapped around a cable management system incorporated into the underside of the base component.

FIGS. 5A-6 illustrate another embodiment of a watch stand 10' which like the watch stand 10 embodiment previously described in connection with FIGS. 1-4B, includes a base support 11' having a top surface and an opposing bottom surface configured to stand on a support surface such as a desk or table, a sleeve 12 extending from the top surface of the base support 11' at a first end section to an open-ended second end section, and a post 13 extending from a first end region to a second end region and being configured to slide into the sleeve 12 at its first end region via the opening at the second end section of the sleeve 12.

The embodiment depicted in FIGS. 5A-6 differs from that of FIGS. 1-4B in that the base support 11' is extended to include an elevated wireless charging surface 41 on its top surface and a cable management system 42 incorporated into its bottom surface. The side of the wireless charging surface 41 that is proximate to the sleeve 12 forms a wall that serves to support mobile devices e.g., the smart phone, like the lip structure 18 previously described.

The cable management system 42 is comprised of a first support post 43 and a second support post 44 that are spaced apart and adapted so that the a charging cable can be wrapped around them yet concealed within the base support 11' when the base support 11' is standing upright a top a support surface such as that depicted in FIGS. 5A and 5B.

Thus as is evident from the drawings, in operation the watch charger 17 is inserted into the watch charger cavity at the top end of the post 13 and the charging cable 16 is wrapped around the helical track 15 on the exterior of the post 13. The post 13 is then inserted into the sleeve 12 at the desired orientation and height. The charging cable may be wrapped around the cable management system 41 located on the underside of the base support as illustrated in FIG. 6. A smart watch 20 can then be positioned, supported and charged a top the watch support surface 14 in the desired portrait or landscape orientation as illustrated in FIGS. 4A-B and 5A-B. Additional mobile devices such as a smart phone 30 can be stored and charged on the watch stand either via a charging cable or if such devices are wireless chargeable then via the wireless charging surface 41.

Each of the foregoing and various aspects, or teachings herein together with those set forth in the claims and described in connection with the embodiments of the protective cases summarized above or otherwise disclosed herein including the drawings and the written description may be combined to form claims for a device, apparatus, system, method of manufacture, and/or use without limitation.

Although various inventive aspects are herein disclosed in the context of certain preferred embodiments, implementations, and examples, it will be understood by those skilled in the art that the present invention extends beyond the specifically disclosed embodiments to other alternative embodiments and/or uses of the invention and obvious modifications and equivalents thereof. In addition, while various aspects have been shown and described in detail, modifications of such aspects will be readily apparent to those of skill in the art based upon this disclosure. It should be also understood that the scope of this disclosure includes the various combinations or sub-combinations of the specific features and aspects of the embodiments disclosed herein, such that the various features, modes of implementation, and aspects of the disclosed subject matter may be combined with one another in whole or in part. Thus, it is intended that the scope of the present invention herein disclosed should not be limited by the particular disclosed embodiments or implementations described above, but should be determined only by a fair reading of the claims.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Claims are hereby expressly incorporated into this Detailed Description, with each claim standing on its own as a separate embodiment.

What is claimed is:

1. A watch stand comprising:
   a base support having a bottom side and a top side opposed to the bottom side;
   a sleeve having an opening and extending from the base support; and
   a post having a first end region and a second end region with an angled support surface provided at the second end region, wherein the post is configured to be removably inserted into the opening of the sleeve at the first end region and fixedly positioned thereon, wherein the post includes a helical groove encircling the exterior of the post from below the support surface to the first end region of the post, and wherein the helical groove is configured to receive and manage a charging cable that is coupled to the second end region of the post.

2. The watch stand of claim 1, wherein the base support has a bottom surface and a top surface opposed to the bottom surface, wherein the top surface is sloped downward as it extends from a first side to a second side.

3. The watch stand of claim 2 further including a lip extending above the top surface at the second side of the base support.

4. The watch stand of claim 1, wherein the support surface is configured to support a smart watch.

5. The watch stand of claim 1, wherein the post has a hollow core.

6. The watch stand of claim 1, wherein the support surface is configured to receive and retain a watch charger.

7. The watch stand of claim 1, wherein the height of the post relative to the sleeve is adjustable.

8. The watch stand of claim 1, wherein the support surface is configured into different orientations relative to the base support.

9. The watch stand of claim 1, wherein the base support has a cable management system located on the bottom side.

10. The watch stand of claim 1, wherein the base support includes a wireless charging surface.

11. The watch stand of claim 10, wherein the wireless charging surface is elevated related to and adjacent to the top surface of the base support positioned more proximate to the sleeve.

12. A watch stand comprising:
    a base support having a bottom side, a top side opposed to the bottom side and a cable management system located on the bottom side, wherein the cable management system includes a plurality of support posts that are spaced apart from one another;
    a sleeve having an opening and extending from the base support; and
    a post having a first end region and a second end region with an angled support surface provided at the second end region, wherein the post has a hollow core, and wherein the post is configured to be removably inserted into the opening of the sleeve at the first end region and fixedly positioned thereon.

13. The watch stand of claim 12, wherein the support surface is configured to support a smart watch.

14. A watch stand comprising:
    a base support having a bottom side, a top side opposed to the bottom side, and a cable management system located on the bottom side; and
    a post located on the top side and having a first end region and a second end region with an angled support surface provided at the second end region, wherein the post includes a helical groove encircling the exterior of the post from below the support surface to the first end region of the post, and wherein the helical groove is configured to receive and manage a charging cable that is coupled to the second end region of the post.

15. The watch stand of claim 14, wherein the cable management system includes a first support post and a second support post, and wherein the first support post and the second support post are spaced apart from each another.

16. The watch stand of claim 14, wherein the support surface is configured to support a smart watch.

17. The watch stand of claim 14, wherein the post has a hollow core.

18. The watch stand of claim 14, wherein the support surface is configured to receive and retain a watch charger.

19. The watch stand of claim 14, wherein the base support includes a wireless charging surface.

20. The watch stand of claim 19, wherein the wireless charging surface is elevated related to and adjacent to the top surface of the base support positioned more proximate to the sleeve.

* * * * *